(12) United States Patent
Akiyama et al.

(10) Patent No.: US 12,041,687 B2
(45) Date of Patent: Jul. 16, 2024

(54) SPECIFYING DEVICE, SPECIFYING METHOD, AND SPECIFYING PROGRAM

(71) Applicant: NIPPON TELEGRAPH AND TELEPHONE CORPORATION, Tokyo (JP)

(72) Inventors: Mitsuaki Akiyama, Tokyo (JP); Eitaro Shioji, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 357 days.

(21) Appl. No.: 17/605,658

(22) PCT Filed: Apr. 25, 2019

(86) PCT No.: PCT/JP2019/017800
§ 371 (c)(1),
(2) Date: Oct. 22, 2021

(87) PCT Pub. No.: WO2020/217431
PCT Pub. Date: Oct. 29, 2020

(65) Prior Publication Data
US 2022/0217520 A1  Jul. 7, 2022

(51) Int. Cl.
*H04W 8/00* (2009.01)
*H04L 9/40* (2022.01)

(52) U.S. Cl.
CPC ......... *H04W 8/005* (2013.01); *H04L 63/0876* (2013.01)

(58) Field of Classification Search
CPC .......................... H04W 8/005; H04L 63/0876
See application file for complete search history.

(56) References Cited

U.S. PATENT DOCUMENTS

| 8,180,916 B1* | 5/2012 | Nucci | H04L 43/028 709/224 |
| 2017/0339171 A1* | 11/2017 | Aoki | G06F 21/56 |
| 2018/0046800 A1* | 2/2018 | Aoki | G06F 21/56 |

FOREIGN PATENT DOCUMENTS

JP  2019-61399 A  4/2019

OTHER PUBLICATIONS

Boulaiche et al. "An auto-learning approach for network intrusion detection" https://doi.org/10.1007/s11235-017-0395-z Telecommun Sys (2018) 68:277-294 Sep. 27, 2017 (Year: 2017).*
Durumeric et al. (2014) "ZMap: Fast Internet-Wide Scanning and its Security Applications" USENIX Security, [online] Accessed on Apr. 19, 2019, website: <URL: https://zmap.io/paper.pdf>.
(Continued)

*Primary Examiner* — Basil Ma

(57) ABSTRACT

An identification device includes processing circuitry configured to collect response information of a device by performing network scanning on a target network address group, accumulate the response information collected, compare pieces of response information having different scanning times with each other among pieces of the response information accumulated and calculate a degree of similarity between contents of responses, and identify that devices that transmit most similar pieces of response information are identical, based on the degree of similarity calculated.

6 Claims, 10 Drawing Sheets

(56) References Cited

OTHER PUBLICATIONS

Robertdavidgraham / masscan (2019) "MASSCAN: Mass IP port scanner" [online] Accessed on Mar. 22, 2019, website: <URL: https://github.com/robertdavidgraham/masscan>.
Shodan (2013-2019) "The search engine for the Internet of Things" [online] Accessed on Mar. 22, 2019, website: <URL: https://www.shodan.io>.
Durumeric et al. (2015) "A Search Engine Backed by Internet-Wide Scanning" ACM CCS, [online] Accessed on Mar. 22, 2019, website: <URL: https://censys.io/static/censys.pdf>.
International Application No. PCT/JP2019/017800, International Search Report mailed Jul. 16, 2019, 2 pages.
Noguchi et al. (2018) "IoT device identification based on similarity analysis of communication" IEICE Technical Report, vol. 118, No. 123, pp. 45-50 (English Abstract only).

\* cited by examiner

| SCAN ID | TARGET IP ADDRESS | RESPONSE |
|---|---|---|
| St1 | 192.168.1.1 | ABCDE |
| St1 | 192.168.1.2 | FGHIJK |
| St1 | 192.168.1.3 | 123456 |
| ... | ... | ... |
| St2 | 192.168.1.1 | ABCDE |
| St2 | 192.168.1.2 | 123456 |
| St2 | 192.168.1.3 | FGHIJK |
| ... | ... | ... |

Fig. 2

| St1 \ St2 | ADDRESS B | ADDRESS C | ADDRESS F |
|---|---|---|---|
| ADDRESS A | 1.0 | 0.7 | 0.1 |
| ADDRESS C | 0.8 | 0.4 | 0.6 |
| ADDRESS D | 0.5 | 0.6 | 0.9 |

Fig. 4

| St1 \ St2 | ADDRESS B | ADDRESS C | ADDRESS F |
|---|---|---|---|
| ADDRESS A | 1.0 | 0.7 | 0.1 |
| ADDRESS C | 0.8 | 0.4 | 0.6 |
| ADDRESS D | 0.5 | 0.6 | 0.9 |

Fig. 5

| St1 \ St2 | ADDRESS B | ADDRESS C | ADDRESS F |
|---|---|---|---|
| ADDRESS A | 1.0 | 0.7 | 0.1 |
| ADDRESS C | 0.8 | 0.4 | 0.6 |
| ADDRESS D | 0.5 | 0.6 | 0.9 |

Fig. 6

St1: ADDRESS A, St2: ADDRESS B
St1: ADDRESS D, St2: ADDRESS F

Fig. 7

SPECIFYING DEVICE, SPECIFYING METHOD, AND SPECIFYING PROGRAM

CROSS-REFERENCE TO RELATED APPLICATIONS

This application is a U.S. 371 Application of International Patent Application No. PCT/JP2019/017800, filed on 25 Apr. 2019, the disclosure of which is hereby incorporated herein by reference in its entirety.

TECHNICAL FIELD

The present disclosure relates to an identification device, an identification method, and an identification program.

BACKGROUND ART

On the Internet, a wide diversity of devices including Internet of Things (IoT) are connected and operate. Such devices may have security issues such as vulnerability, weak authentication settings, false settings, and the like. For example, a case where the default setting remains and a case where an ID and a password are kept being used in common are considered as a case of the weak authentication setting. As an attack using the vulnerability of a device, Mirai which targets IoT devices such as network cameras has been reported.

Thus, in order to quickly discover such devices and take measures, development of a tool for discovering devices connected on the Internet (see Non Patent Literatures 1 and 2), and research to build a database of the discovered devices (see Non Patent Literatures 3 and 4) have been performed.

As a method of discovering a device on a network, first, a countermeasure device performs network scanning. The network scanning is processing of transmitting any request to an IP address of a scanning target and collecting a response from the scanning target to that request. The countermeasure device can collect the response from a device so long as the device exists on the IP address of the scanning target and the device is set to respond. Because the response may include device-specific information, the countermeasure device identifies the type of device or the like by using crisis-specific information included in the response. In addition, the countermeasure device also determines a security hole or the like depending on the content of the response.

Thus, the countermeasure device can perform security measures of identifying the vulnerability and a security hole of a device by discovering the device on the network.

CITATION LIST

Non Patent Literature

Non Patent Literature 1: Zakir Durumeric, et al., "ZMap: Fast Internet-Wide Scanning and its Security Applications", USENIX Security, 2014. [Searched on Apr. 19, 2019], Internet <URL: https://zmap.io/paper.pdf>
Non Patent Literature 2: robertdavidgraham/masscan, [Search on Mar. 22, 2019], Internet <URL: https://github.com/robertdavidgraham/masscan>
Non Patent Literature 3: Shodan, [Searched on Mar. 22, 2019], Internet <URL: https://www.shodan.io>
Non Patent Literature 4: Zakir Durumetic, et al., "A Search Engine Backed by Internet-Wide Scanning", ACM CCS, 2015, [Search on Mar. 22, 2019], Internet <URL: https://censys.io/static/censys.pdf>

SUMMARY OF THE INVENTION

Technical Problem

Regarding the network scanning, there is a method for increasing the speed of scanning to collect the presence or absence of a response or collect response information (Non Patent Literatures 1 and 2). With such a technique, the countermeasure device can quickly discover a device existing on the network, make a list of such devices, and perform measures based on the list.

However, the IP address of a device on a network may be changed. As described above, when the IP address is changed, there is a problem in that information managed by the list of devices based on IP addresses until now becomes obsolete. In addition, there is a problem in that the devices are counted multiple times even though the devices are the identical devices.

In particular, the latter problem is problematic when a method as follows is taken: the number of unique IP addresses obtained by simply merging an IP address group from which a response is received in scanning at a certain time point t and an IP address group from which a response is received in scanning at another time point u is used as the total number of devices. Specifically, as an example, a case where the IP address of a device in which the IP address at the time point t is "IP_a" is changed to "IP_b" at the time point u will be described. In this case, even though this device is identical, since the IP address changes at the time point t and the time point u, the device is counted twice.

When such multiple counts occur frequently, it may not be possible to accurately manage device information. As a result, there are concerns that it is not possible to utilize the management contents as measures, or erroneous measures are performed. For example, the countermeasure device estimates the number of devices discovered more than necessary, and performs measures in an erroneous scale.

In view of the technical problems described above, an object of the present disclosure is to provide an identification device, an identification method, and an identification program of identifying the identical device regardless of a change of an IP address occurring between scans at different time points.

Means for Solving the Problem

To solve the above problem and achieve the above object, according to an aspect of the present disclosure, an identification device includes processing circuitry configured to collect response information of a device by performing network scanning on a target network address group, accumulate the response information collected, compare pieces of response information having different scanning times with each other among pieces of the response information accumulated and calculate a degree of similarity between contents of responses, and identify that devices that transmit most similar pieces of response information are identical, based on the degree of similarity calculated.

Effects of the Invention

According to the present disclosure, it is possible to identify that devices are the identical devices regardless of a change of the IP address between scanning at different time points.

BRIEF DESCRIPTION OF DRAWINGS

FIG. 2 is a diagram illustrating an example of accumulation information accumulated by a response accumulation unit illustrated in FIG. 1.

FIG. 3-1 is a diagram illustrating a response result of network scanning (first network scanning) at a time point t1.

FIG. 3-2 is a diagram illustrating a response result of network scanning (second network scanning) at a time point t2 ($\neq$t1).

FIG. 4 is a diagram illustrating an example in which a calculation result of the degree of similarity obtained by a similarity calculation unit illustrated in FIG. 1 is represented as a similarity matrix.

FIG. 5 is a diagram illustrating a combination of IP addresses obtained to be an overall optimal solution from the similarity matrix illustrated in FIG. 4.

FIG. 6 is a diagram illustrating a combination of IP addresses obtained to be a stable matching solution from the similarity matrix illustrated in FIG. 4.

FIG. 7 is a diagram illustrating an example of an output result output by an identification unit illustrated in FIG. 1.

DESCRIPTION OF EMBODIMENTS

Hereinafter, an embodiment of the present disclosure will be described in detail with reference to the drawings. The present disclosure is not limited to the embodiment. Further, in description of the drawings, the same parts are denoted by the same reference signs.

Embodiment

Overview of Communication System

Figure 1:
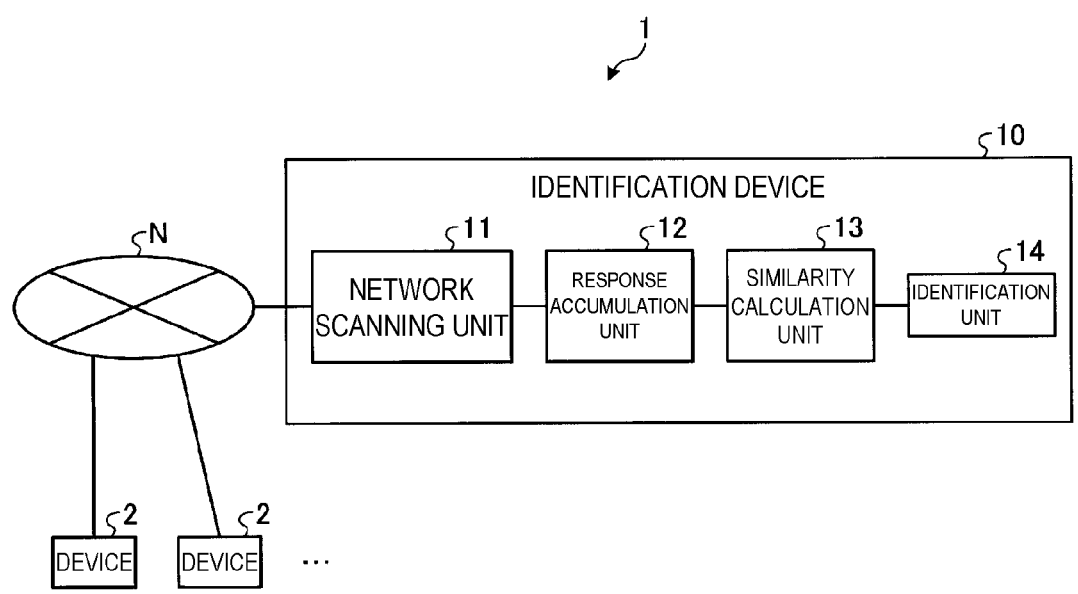
FIG. 1 is a diagram illustrating an example of a configuration of a communication system according to an embodiment.

Firstly, a communication system according to Embodiment 1 will be described with reference to FIG. 1. FIG. 1 is a diagram illustrating an example of a configuration of a communication system according to an embodiment.

As illustrated in FIG. 1, a communication system 1 includes an identification device 10 and a plurality of devices 2. The identification device 10 and the plurality of devices 2 are connected to each other via a network N.

The device 2 has a communication function for enabling a communication with the identification device 10 via the network N. An IP address is assigned to each of the devices 2. When receiving a request by the identification device 10, each of the devices 2 transmits, to the identification device 10, response information including an IP address in the content of a response, for example. The devices 2 are IoT devices such as network cameras. The devices 2 may be different types of devices, or may be the same type of devices.

The device 2 existing on the network in the communication system 1 is identified. The identification device 10 performs network scanning on the IP address of each of the devices 2 based on a list, and identifies the device 2 existing on the network based on the response information transmitted from the device 2. The identification device 10 compares pieces of response information having different scanning times, to identify that the device 2 is identical even though the IP address assigned to the device 2 is changed.

This allows the occurrence of multiple counts to be reduced in the identification device 10. Thus, in the communication system 1, it is possible to perform accurate management of information of the device 2 and perform appropriate measures.

Configuration of Identification Device

Next, a configuration of the identification device 10 will be described with reference to FIG. 1. The identification device 10 is implemented by a computer including a read only memory (ROM), a random access memory (RAM), a central processing unit (CPU), and the like reading a predetermined program and by the CPU executing the predetermined program. The identification device 10 includes a network interface card (NIC) or the like and can also communicate with other devices via an electric communication line such as a local area network (LAN) or the Internet. The identification device 10 includes a network scanning unit (collection unit) 11, a response accumulation unit (accumulation unit) 12, a similarity calculation unit 13 (calculation unit), and an identification unit 14.

The network scanning unit 11 collects response information (response) of the device 2 obtained by performing network scanning on a target network address group. The response accumulation unit 12 accumulates the responses collected by the network scanning unit 11. The similarity calculation unit 13 compares responses having different scanning times among responses accumulated by the response accumulation unit 12, with each other and calculates the degree of similarity between the contents of the responses. The identification unit 14 identifies that the devices 2 that have transmitted the most similar response are identical, based on the degree of similarity calculated by the similarity calculation unit 13.

Network Scanning Unit

Next, processing of the network scanning unit 11 will be described. The network scanning unit 11 performs network scanning based on a list of assigned IP addresses. The network scanning refers to processing of transmitting some request packets to a target IP address and receiving the response.

There is no constraint on the request packet transmitted by the network scanning unit 11, but it is desirable to target a protocol that includes more information as a response. For example, the network scanning unit 11 targets the protocols of the hypertext transfer protocol (HTTP) and the hypertext transfer protocol secure (HTTPS). A device that operates a web server uses the HTTP or HTTPS protocol. Thus, the network scanning unit 11 can acquire, as a response, a web content retained by the device 2 when the HTTP or HTTPS protocol is targeted. The web content is often specific to the device 2.

When HTTPS is targeted, the network scanning unit 11 can also obtain an SSL certificate retained by the web server. The SSL certificate is often specific to the device 2.

The network scanning unit 11 can also obtain information on a header field of the transmission control protocol (TCP) included in the response, regardless of the protocol of a higher layer, such as HTTP or HTTPS. The header field of TCP includes information of time-to-live (TTL), the maximum segment size (MSS), an initial sequence number (ISN), and the like. The above information may characteristically differ depending on the OS of the device 2.

The network scanning unit 11 transmits the defined request to the list of assigned IP addresses at the defined time point. The network scanning unit 11 receives a response from the scanning target and outputs the response to the response accumulation unit 12.

Here, an IP address list is desirably within a range of dynamic IP address reallocation. For example, the IP address list is desirably provided within a range of the same organization network, the same Internet services provider (ISP), or the like. Regarding this, when the scanning target IP address list does not include the allocation range of the dynamic IP address, an IP address different from the scanning target IP address may be assigned to the device 2. In this case, the identical device 2 does not necessarily exist between different scans. Thus, the probability that the identity of the device 2 can be accurately determined between scans is decreased.

Response Accumulation Unit

The response accumulation unit 12 accumulates response information of the scan received from the network scanning unit 11. The response accumulation unit 12 is configured to assign the same scan ID to the response of each scan in a series of scans on a specific IP address list, which is performed at a certain time point, and to enable management of the network scanning for each time point.

Figures 1, 3:
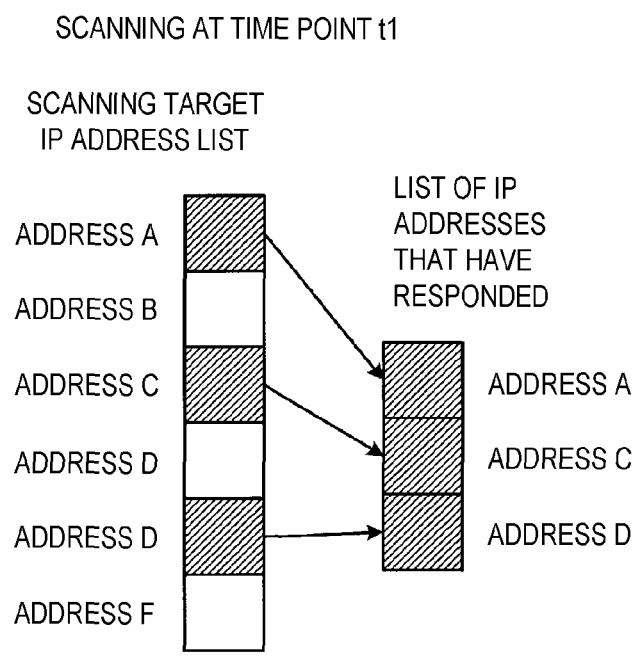
Figures 2, 3:
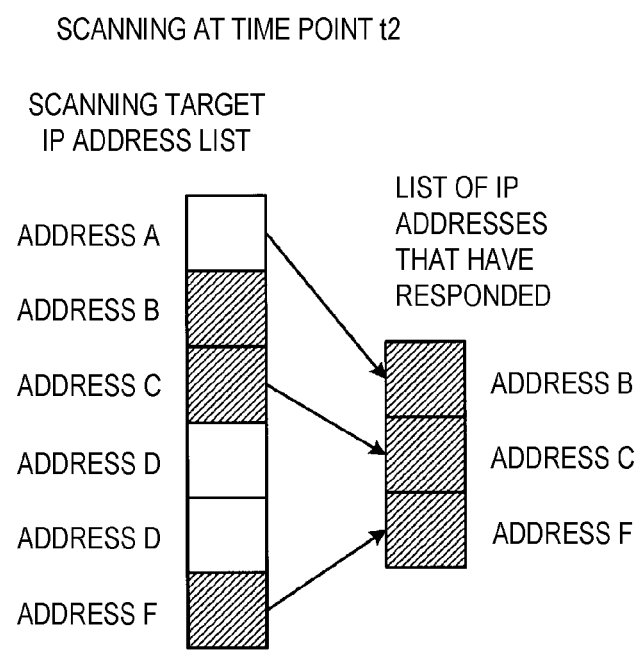

FIG. 2 is a diagram illustrating an example of accumulation information accumulated by the response accumulation unit 12 illustrated in FIG. 1. As illustrated in FIG. 2, for example, the response accumulation unit 12 assigns the same scan ID "St1" to the response of each scan in a series of scans on the specific IP address list, which is performed at a time point t1. The response accumulation unit accumulates response information associated with the scan ID, the target IP address, and the response content.

Similarity Calculation Unit

Next, the similarity calculation unit 13 will be described. The similarity calculation unit 13 calculates how similar the response contents of two different scans to the same IP address list are FIG. 3-1 is a diagram illustrating the response result of the network scanning (first network scanning) at the time point t1. FIG. 3-2 is a diagram illustrating a response result of the network scanning (second network scanning) at a time point t2 ($\neq$t1).

Firstly, in the network scanning, because there is an IP address from which a response is not obtained, the similarity calculation unit 13 excludes such an IP address from the processing target of the similarity calculation. As a case where the response is not obtained, there are a case where the IP address is not assigned to the device 2, and a case where any device on the network or a request on the device 2 is filtered, and the like. Thus, the similarity calculation unit 13 excludes the IP address with no response, from the similarity calculation target.

For example, as illustrated in FIG. 3-1, the similarity calculation unit 13 excludes addresses B, D, and F with no response among addresses A to F in the scanning target IP address list, from the similarity calculation target in the scanning at the time point t1. The similarity calculation unit 13 sets the responses from the addresses A, C, and D as the similarity calculation targets at the time point t1. As illustrated in FIG. 3-2, the similarity calculation unit excludes the addresses A, D, and D with no response among the addresses A to F in the scanning target IP address list, from the similarity calculation target in the scanning at the time point t2. The similarity calculation unit 13 sets the responses from the addresses B, C, and F as the similarity calculation targets at the time point t2.

A case where there are n IP addresses from which the response is received in the network scanning at the time point t1, among X IP addresses as the scanning target, and there are m IP addresses from which the response is received in the network scanning at the time point t2 will be described. In this case, the similarity calculation unit 13 compares each of the n pieces of response information in the network scanning at the time point t1 with each of the m pieces of response information in the network scanning at the time point t2. Then, the similarity calculation unit calculates the degree of similarity for each combination of n× m sets of IP addresses.

The similarity calculation unit 13 represents the calculated degree of similarity of each of the n×m sets, as each element in a similarity matrix of n rows and m columns. For example, the similarity calculation unit 13 compares three responses of the addresses A, C, and D from which the response is received in the network scanning at the time point t1, with three responses of the addresses B, C, and F from which the response is received in the network scanning at the time point t2. Then, the similarity calculation unit 13 calculates the degree of similarity for each combination of 3×3 sets of IP addresses.

FIG. 4 is a diagram illustrating an example in which the calculation result of the degree of similarity obtained by the similarity calculation unit 13 illustrated in FIG. 1 is represented as the similarity matrix. The similarity calculation unit 13 calculates the degree of similarity of the content of the response for the combinations of nine sets of IP addresses from which the response has been received in the network scanning at the time points t1 and t2. In FIG. 4, the degree of similarity of each set, which is calculated by the similarity calculation unit 13 is represented as each element of the similarity matrix. In the example of FIG. 4, the degree of similarity is normalized by 0 to 1. The closer the degree of similarity is to 1, the more similar the responses are. The maximum value of the normalization may be any value.

The similarity calculation unit 13 calculates the degree to which character strings coincide with each other between two responses, as the degree of similarity. As a method of calculating the degree of similarity, for example, a method using the longest common subsequence (LCS) may be applied. The LCS means the longest of subsequences that are common between two character strings. It is assumed that the subsequences are not necessarily continuous, but the order is not to be changed.

For example, for a response Ra "abcdef" and a response Rb "abfcdf", the LCS is "abcdf". At this time, the degree of similarity can be calculated as 2×LCS/(length (response Ra)+length (response Rb)). When the response Ra and the response Rb are identical to each other, the degree of similarity is 1. On the other hand, when there is no common subsequence between the response Ra and the response Rb, that is, when the response differs completely, the degree of similarity is 0.

Here, as information obtained to be the response, there is a value (such as TTL or MSS) of a TCP header field, a response (such as Telnet, SSH, HTTP, and HTTPS) of the protocol of a higher layer. In the present embodiment, the above pieces of information are collectively used as the response and used for comparison for similarity calculation.

For example, as a response of HTTP, there are an HTTP header and an HTTP body, and the similarity calculation unit 13 uses both of the HTTP header and the HTTP body for similarity calculation. In a case of HTTPS, the similarity calculation unit 13 uses an SSL certificate transmitted from the web server (device 2) during handshaking of the TLS connection, for the similarity calculation. In the SSL certificate, information regarding the web server is described, which may be information characterizing the device 2.

Identification Unit

Next, the identification unit 14 illustrated in FIG. 1 will be described. The identification unit 14 identifies which IP addresses the devices are the identical, from the similarity of the responses between two different network scanning.

Thus, the identification unit 14 uses the similarity matrix created by the similarity calculation unit 13. The identification unit 14 obtains the most appropriate combination of IP addresses that transmit similar responses between different scans, based on each element (degree of similarity) of the similarity matrix. That is, the identification unit 14 obtains, based on each element of the similarity matrix, the most appropriate combination of IP addresses that transmit similar contents of the responses between the network scanning at the time point t1 and the network scanning at the time point t2. Then, the identification unit 14 identifies that the devices on the IP addresses of the obtained combination are the identical devices.

Here, an appropriate combination cannot be specified by a method aiming at an overall optimal solution such as the Hungarian algorithm. The overall optimal solution is a matching method maximizing the sum of the evaluation values of the combinations, that is, the sum of the degree of similarity.

FIG. 5 is a diagram illustrating the combination of IP addresses obtained to be the overall optimal solution from the similarity matrix illustrated in FIG. 4. As illustrated in FIG. 5, the degree of similarity between the address A of the scan ID "St1" and the address B of the scan ID "St2" is the highest at "1.0". Nevertheless, when a method aimed at the overall optimal solution is applied, the combination of the address A of the scan ID "St1" and the address C of the scan ID "St2" is the most appropriate combination instead of the above combination.

Thus, the identification unit 14 uses the matching method of obtaining a stable matching solution instead of an overall optimal solution. For example, there is a Gale-Shapley algorithm as the matching method for obtaining a stable matching solution. In such an algorithm, a state where, even though a pair having the highest degree of similarity is provided, a different pair having the lowest degree of similarity is selected does not occur.

FIG. 6 is a diagram illustrating the combination of IP addresses obtained to be the stable matching solution from the similarity matrix illustrated in FIG. 4.

As illustrated in FIG. 6, when the matching method of obtaining the stable matching solution is applied, the address A of the scan ID "St1" and the address B of the scan ID "St2" are obtained to be the most appropriate combination of the IP addresses. The address A of the scan ID "St1" and the address B of the scan ID "St2" show very high degree of similarity of "1.0". The address D of the scan ID "St1" and the address F of the scan ID "St2" are obtained to be the most appropriate combination of IP addresses. The address D of the scan ID "St1" and the address F of the scan ID "St2" show high degree of similarity of "0.9".

On the contrary, the address C of the scan ID "St1" and the address C of the scan ID "St2" show relatively low degree of similarity of "0.4". In two different network scanning, identical device 2 is not always present during any network scanning. For example, the device 2 of which the power is turned off does not respond to the network scanning, and the device 2 that is newly connected to the network responds to the network scanning.

Thus, the identification unit 14 identifies that, for a combination showing low degree of similarity, specifically, for a combination of elements (degree of similarity) lower than a predetermined threshold value set in advance, the devices 2 on the IP addresses of the combination corresponding to this element are identified as different devices 2. The identification unit 14 eliminates the combination of elements (degree of similarity) lower than the predetermined threshold value set in advance. The identification unit 14 outputs the IP addresses of the final combination as the IP address of the identical device.

FIG. 7 is a diagram illustrating an example of the output result output by the identification unit 14 illustrated in FIG. 1. In the example of FIG. 7, the identification unit 14 outputs the address A at the scan ID "St1" and the address B at the scan ID "St2" in association with each other, so as to show that the address A at the scan ID "St1" and the address B at the scan ID "St2" are the IP address of the identical device.

That is, this means that the device 2 existing at the address A in the network scanning at the time point t1 has moved to the address B in the network scanning at the time point t2. In addition, this means that the device 2 existing at the address D in the network scanning at the time point t1 has moved to the address F in the network at the time point t2.

The reason why the degree of similarity is not necessarily highest in different scans even though the devices 2 are the identical is that the response of the device 2 changes. For example, a case where banner information is changed due to the update of the device 2 and a case where the content is changed by the owner of the device 2 are applicable.

As the threshold value used in determining the elimination of combination, any value can be set. In this case, the threshold value is set on the assumption that the response changes even in the identical device.

Processing Procedure of Identification Processing

Figure 8:
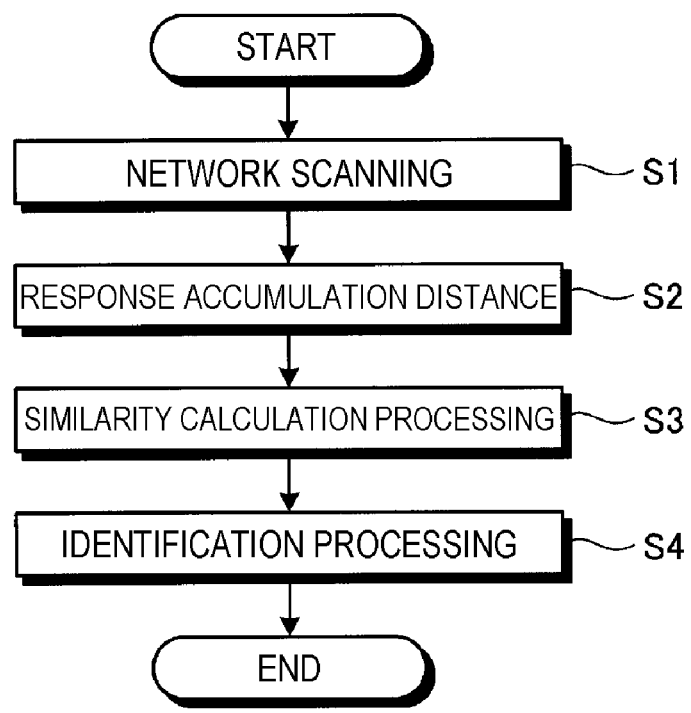
FIG. 8 is a flowchart illustrating a processing procedure of identification processing according to the embodiment.

Next, a processing procedure of identification processing performed by the identification device 10 will be described. FIG. 8 is a flowchart illustrating the processing procedure of identification processing according to the embodiment.

As illustrated in FIG. 8, in the identification device 10, the network scanning unit 11 performs network scanning on the target IP address based on the list of IP addresses, and collects the response of the device 2 (Step S1). The response accumulation unit 12 performs response accumulation processing of accumulating the response collected in Step S1 (Step S2).

The similarity calculation unit 13 performs similarity calculation processing of comparing the responses having different scanning times among pieces of response information accumulated in Step S2, and calculating the degree of similarity between the contents of the responses (Step S3). The identification unit 14 performs identification processing of identifying that the devices 2 that have transmitted the most similar response are identical, based on the degree of similarity calculated in Step S3 (Step S4).

Effect of Embodiment

As described above, the identification device 10 according to the embodiment collects the response of the device 2 by performing network scanning on the target network address group, and accumulates the collected response. The identification device 10 compares the responses having different scanning times among the accumulated responses, and calculates the degree of similarity between the contents of the responses, and identifies that the devices that have transmitted the most similar response are identical, based on the calculated degree of similarity. Specifically, the identification device 10 obtains a combination of IP addresses having high degree of similarity between different network scanning, and identifies, from the combination of IP addresses, which IP address the IP address of a certain device 2 has changed to or whether the IP address of the device has changed, between scanning at the different time points.

In a method in the related art, there is a problem that, when the IP address of the device changes, it is not possible to identify that the devices are the identical devices, so the devices are counted multiple times. On the other hand, according to the identification device 10 according to the present embodiment, the degree of similarity between responses having different scanning times is calculated, and it is identified, based on the calculated degree of similarity, that the devices that have transmitted the most similar responses are identical. Thus, even though the IP address changes between scanning at different time points, it is possible to identify the identical device 2. Thus, according to the present embodiment, a multiple count problem does not occur, and it is possible to accurately manage the device 2 on the network.

System Configuration in Embodiment

Each component of the identification device 10 illustrated in FIG. 1 is a functional concept and may not necessarily be physically configured as in the drawing. That is, the specific form of distribution and integration of the functions of the identification device 10 is not limited to the illustrated form, and the entirety or a portion of the form can be configured by being functionally or physically distributed and integrated in any unit, depending on various loads, usage conditions, and the like.

All or some types of processing performed by the identification device 10 may be implemented by a CPU and a program that is analyzed and executed by the CPU. The processing performed by the identification device 10 may be implemented as hardware based on a wired logic.

All or some of the processing operations described as being automatically performed among the processing operations described in the embodiment may be manually performed. Alternatively, all or some of the processing operations described as being manually performed can be automatically performed using a known method. In addition, the processing procedures, control procedures, specific names, and information including various types of data and parameters described and illustrated above can be appropriately changed unless otherwise specified.

Program

Figure 9:
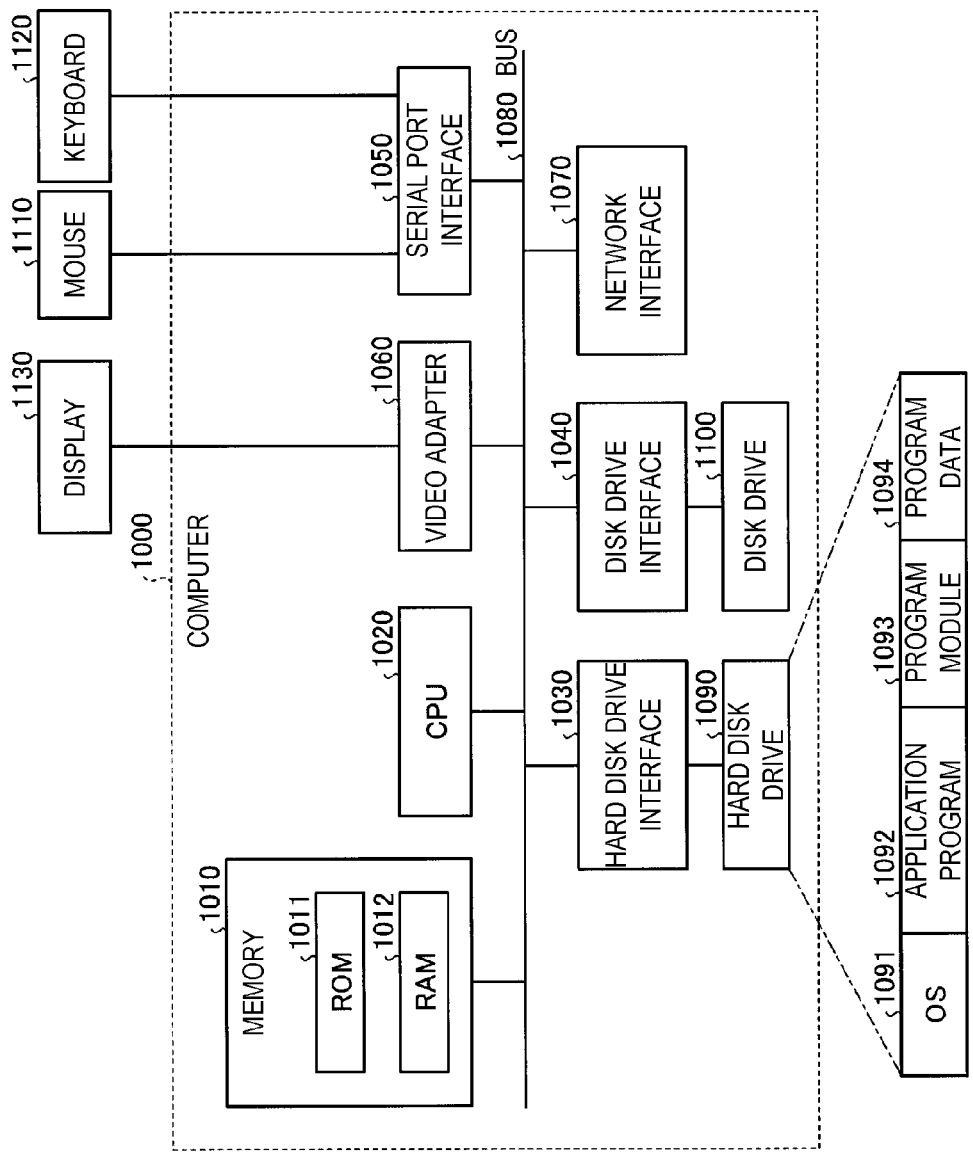
FIG. 9 is a diagram illustrating an example of a computer that executes a program to implement an identification device.

FIG. 9 is a diagram illustrating an example of a computer that executes a program to implement the identification device 10. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. These units are connected by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. A detachable storage medium such as a magnetic disk or an optical disc, for example, is inserted into the disk drive 1100. The serial port interface 1050 is connected to, for example, a mouse 1110 and a keyboard 1120. The video adapter 1060 is connected to a display 1130, for example.

The hard disk drive 1090 stores, for example, an OS 1091, an application program 1092, a program module 1093, and program data 1094. That is, a program defining each type of processing of the identification device 10 is implemented as the program module 1093 in which codes executable by the computer 1000 is described. The program module 1093 is stored in, for example, the hard disk drive 1090. For example, the program module 1093 for executing similar processing as for the functional configurations of the identification device 10 is stored in the hard disk drive 1090. The hard disk drive 1090 may be replaced with a solid state drive (SSD).

Further, configuration data to be used in the processing of the embodiment described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the program module 1093 or the program data 1094.

The program module 1093 or the program data 1094 is not limited to being stored in the hard disk drive 1090, and may be stored, for example, in a detachable storage medium and read by the CPU 1020 via the disk drive 1100 or the like. Alternatively, the program module 1093 and the program data 1094 may be stored in another computer connected via a network (a local area network (LAN), a wide area network (WAN), or the like). The program module 1093 and the program data 1094 may be read from another computer via the network interface 1070 by the CPU 1020.

The embodiments to which the disclosure made by the present inventor is applied have been described above, but the present disclosure is not limited to the description and the drawings, which form a part of the disclosure of the present disclosure according to the present embodiment. That is, all other embodiments, examples, operation techniques, and the like made by those skilled in the art based on the present embodiment are included in the scope of the present disclosure.

REFERENCE SIGNS LIST

10 Identification device
11 Network scanning unit
12 Response accumulation unit
13 Similarity calculation unit
14 Identification unit

The invention claimed is:

1. An identification device comprising:
processing circuitry configured to:
collect response information of a device by performing network scanning on a target network address group, wherein the response information of the device is in response to the network scanning, the device is among a plurality of devices associated with the target network address group, the response information includes device-specific content, and the device-specific content is distinct from a network address of the device;
accumulate the response information collected;
compare device-specific contents in pieces of response information having different scanning times with each other among the pieces of the response information accumulated and calculate a degree of similarity between device-specific contents of the pieces of the response information as responses from the plurality of devices; and
identify a set of devices of the plurality of devices that transmit most similar pieces of the response information as an identical device, based on the calculated degree of similarity.

2. The identification device according to claim 1,
wherein, when, among X pieces of IP addresses as scanning targets, a number of IP addresses from which a response is received in first network scanning at a first time point is n (≤X), and a number of IP addresses from which a response is received in second network scanning at a second time point different form the first time point is m (≤X), the processing circuitry is further configured to compare for all combinations between n pieces of the response information in the first network scanning and m pieces of the response information in the second network scanning, and calculate a degree of similarity for each of the combinations of n×m sets of IP addresses.

3. The identification device according to claim 2,
wherein the processing circuitry is further configured to represent the degree of similarity of each of the n×m sets that is calculated, as an element in a similarity matrix of n rows and m columns, and
obtain most appropriate combination of IP addresses that transmit similar contents of responses between the first network scanning and the second network scanning, based on each element in the similarity matrix, and identify that devices on the corresponding IP addresses of the combination that is obtained are identical devices.

4. The identification device according to claim 3,
wherein, regarding an element having a value lower than a predetermined threshold value in the similarity matrix, the processing circuitry is further configured to identify that devices on corresponding IP addresses of a combination corresponding to the element are different devices.

5. An identification method performed by an identification device, the identification method comprising:
collecting response information of a device by performing network scanning on a target network address group, wherein the response information of the device is in response to the network scanning, the device is among a plurality of devices associated with the target network address group, the response information includes device-specific content, and the device-specific content is distinct from a network address of the device;
accumulating the response information that is collected;
comparing device-specific contents in pieces of response information having different scanning times with each other among the pieces of the response information that are accumulated and calculating a degree of similarity between device-specific contents of the pieces of the response information as responses from the plurality of devices; and
identifying a set of devices of the plurality of devices that transmit most similar pieces of the response information as an identical device, based on the calculated degree of similarity.

6. A non-transitory computer-readable recording medium storing therein an identification program that causes a computer to execute a process comprising:
collecting response information of a device by performing network scanning on a target network address group, wherein the response information of the device is in response to the network scanning, the device is among a plurality of devices associated with the target network address group, the response information includes device-specific content, and the device-specific content is distinct from a network address of the device;
accumulating the response information that is collected;
comparing device-specific contents in pieces of response information having different scanning times with each other among the pieces of the response information that are accumulated and calculating a degree of similarity between device-specific contents of the pieces of the response information as responses from the plurality of devices; and
identifying a set of devices of the plurality of devices that transmit most similar pieces of the response information as an identical device, based on the calculated degree of similarity.

* * * * *